Dec. 17, 1968   R. E. MEYER ET AL   3,417,194
COUPLING T FOR VACUUM CLEANER HOSE ASSOCIATED WITH
ELECTRIC HAIR CLIPPERS
Filed Aug. 22, 1966   2 Sheets-Sheet 1
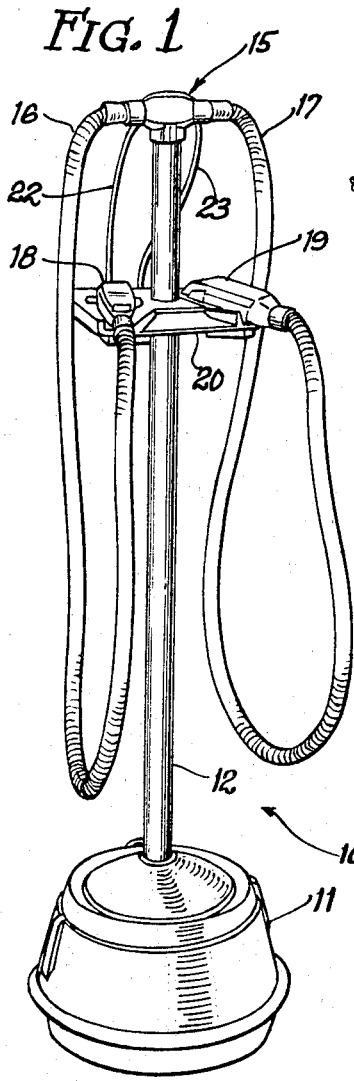
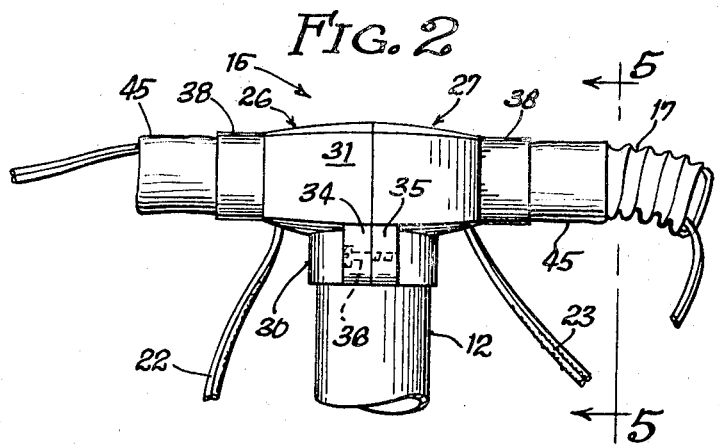
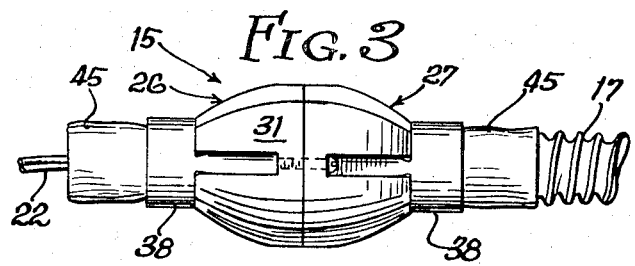
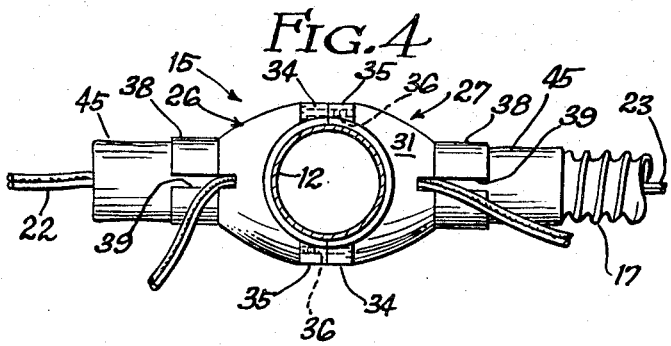
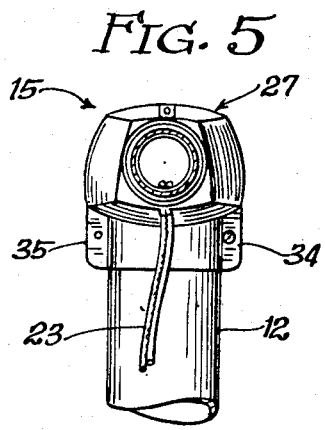
INVENTORS
Roy E. Meyer
John F. Wahl
by Zabel, Baker, York
Jones and Dithmar
Attys

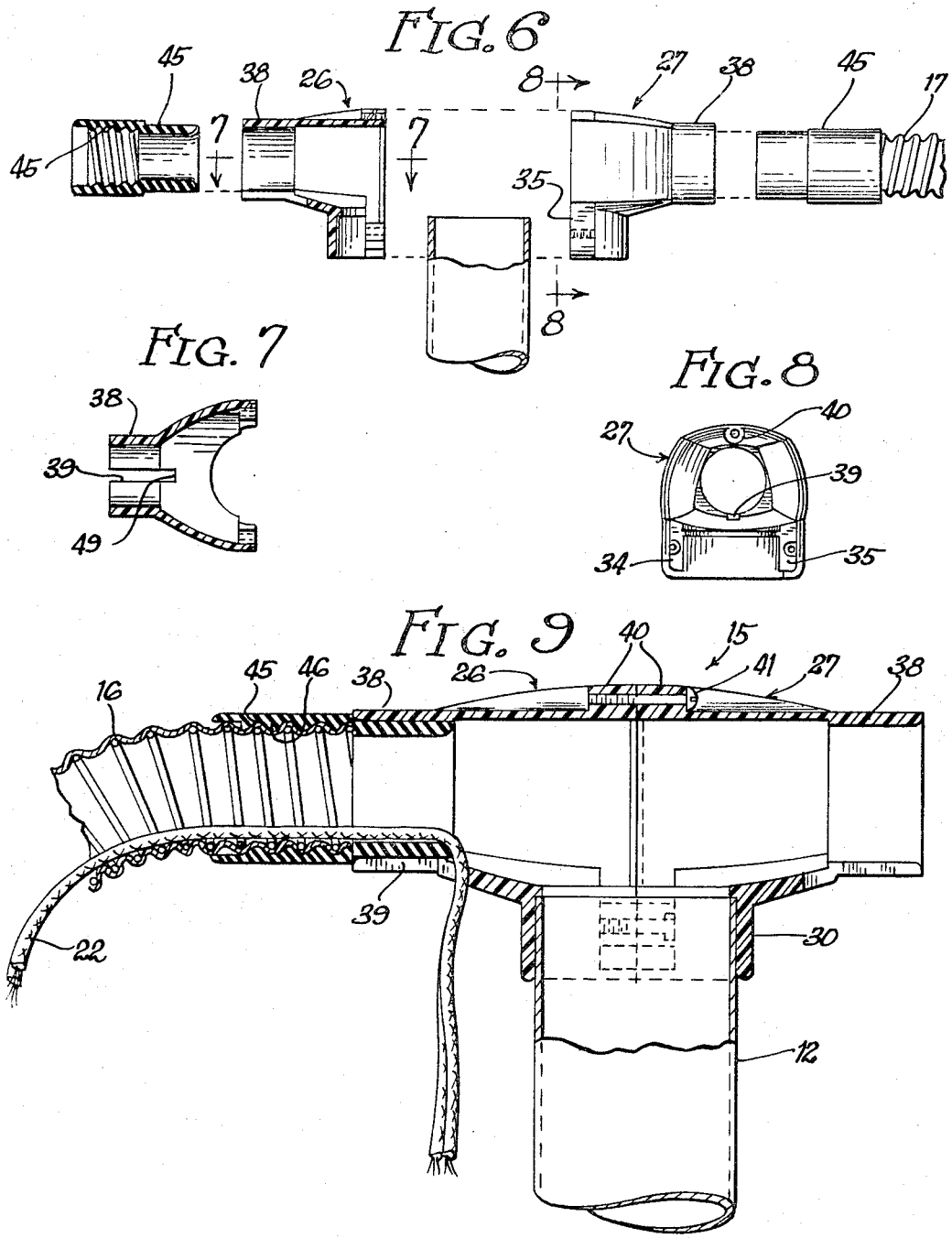

United States Patent Office 3,417,194
Patented Dec. 17, 1968

3,417,194
COUPLING T FOR VACUUM CLEANER HOSE ASSOCIATED WITH ELECTRIC HAIR CLIPPERS
Roy E. Meyer and John F. Wahl., Sterling, Ill., assignors to Wahl Clipper Corporation, Sterling, Ill., a corporation of Illinois
Filed Aug. 22, 1966, Ser. No. 574,189
6 Claims. (Cl. 174—71)

This invention relates to a coupling T for vacuum cleaner hose associated with electric hair clippers.

One object of the invention is to provide a coupling T which constitutes an important component in electric hair clipper apparatus characterized by a vacuum cleaner system adapted to remove hair cuttings during the clipping operation.

Another object is to provide a coupling T comprised of two generally like members whereby only a single simple mold is required. In the form of the invention shown, the two members differ from each other only in the size of an aperture in one of them, and this modification readily can be made prior to assembling the two members.

Another object is to provide a coupling T of hollow configuration having a stem portion and a head portion. The junction of the assembled members lies on a plane which contains the axis of the stem portion and is normal to the axis of the head portion, thereby minimizing the length of the junction and the possibility of air leakage at the junction.

Still another object is to provide a coupling T adapted to connect two flexible hoses to a pipe extending from a low pressure generator. The free ends of the hoses are associated with a pair of electric hair clippers, and the electrical conductor for each clipper extends through the associated hose and exits at the coupling T at the end of a longitudinal slit in the coupling portion of the T to which the hose is connected. The portion of the slit unoccupied by the exiting electrical conductor is closed in sealing manner by a coupling member on the hose end which telescopes the coupling portion of the T.

Another object is to provide a coupling T of the character described which is inexpensive to manufacture, effective in operation, easy to assemble and apply, and of pleasing appearance.

Other objects, advantages and details of the invention will be apparent as the description proceeds, reference being had to the accompanying drawings wherein one form of the invention is shown. It is to be understood that the description and drawings are illustrative only, and that the scope of the invention is to be measured by the appended claims.

In the drawings:

FIG. 1 is a perspective view of electric hair clipper apparatus embodying the coupling T of the invention.

FIG. 2 is a side elevational view of a coupling T of the invention mounted on the upper end of a pipe, other elements normally associated with the T also being shown.

FIG. 3 is a top plan view of the coupling T and other elements shown in FIG. 2.

FIG. 4 is a bottom view of the coupling T and other elements of FIGS. 2 and 3, the associated pipe illustrated in cross section.

FIG. 5 is a sectional view on line 5—5 of FIG. 2.

FIG. 6 is an exploded view, partly in cross section and partly in side elevation, of the coupling T and other elements shown in FIGS. 2–5, the electrical conductors excluded for convenience.

FIG. 7 is a sectional view on line 7—7 of FIG. 6.

FIG. 8 is an elevational view on line 8—8 of FIG. 6.

FIG. 9 is an enlarged sectional view of the coupling T mounted on a pipe, other elements including hose, coupling member and electrical conductor being shown in association with the left coupling portion.

Referring now to the drawings, an exemplary electric hair clipper apparatus 10 embodying the coupling T of the invention is shown in FIG. 1. The illustrated apparatus comprises a base 11 which houses a low pressure generator (not shown), an upstanding pipe 12, a coupling T 15 embodying the invention at the upper end of pipe 12, a pair of flexible hoses 16 and 17, a pair of electric hair clippers 18 and 19, a rest tray 20 mounted on pipe 12 for resting the clippers when not in use and a pair of electrical conductors 22 and 23 extending respectively from the hair clippers through the associated hoses and coupling T to a termination at tray 20.

Clippers 18 and 19 are provided with integral duct members extending between hoses 16 and 17 and the region adjacent the clipper teeth (not shown). An air flow (due to the action of the low pressure generator in base 11) occurs between such regions and the interior of base 11 through hoses 16 and 17, coupling T 15 and pipe 12, the flow being effective to carry away hair cuttings during the clipping operation.

A coupling T 15 embodying the invention is shown in detail in FIGS. 2–5 and 9. FIGS. 6–8 illustrate the component parts of T 15, FIG. 6 also showing certain associated elements which are shown in other of the figures.

T 15 is hollow, as best shown in FIGS. 6 and 9. It comprises a pair of generally like members 26 and 27 which on assembly form a hollow T having a stem portion 30 and a head portion 31 (FIG. 2).

When the two members 26 and 27 are assembled as shown in FIGS. 2–4 and 9, the junction of the members lies on a plane which contains the axis of stem portion 30 and is normal to the axis of head portion 31. This arrangement, compared with a junction plane aligned with the axis of head portion 31, minimizes the length of the junction and the possibility of objectionable air leakage at the junction.

Members 26 and 27 are symmetrical, as will be seen, with one minor exception in the form of the invention shown. Therefore, a single simple mold may be used for both members, a factor contributing to low cost.

Stem portion 30 of T 15 is tubular and adapted to telescope in sealing manner over the free end of pipe 12 which extends to base 11 and the low pressure or vacuum generator contained therein.

Each of the members 26 and 27 in the stem portion has a pair of diametrically opposed external ears 34 and 35, the ears on one member being in alignment with the ears on the other member. Means such as screws 36 secure the aligned ears together when the members are assembled, as best shown in FIG. 4.

Head portion 31 of T 15 terminates at each end in a tubular coupling portion 38. Each coupling portion 38 has a longitudinal slit 39 (best shown in FIGS. 4 and 7), the purpose for which will be described later.

In the form of the invention shown, each member 26 and 27 in the head portion of the member has a boss 40 or equivalent adapted to receive means such as screw 41 to aid in securing the two members together in sealing manner, as best shown in FIG. 9. The portions 40 are here termed bosses because of their appearance in FIG. 9, and it is understood that the bosses can extend either internally of head portion 31, as shown, or externally thereof.

The screw receiving openings in bosses 40 constitute the only difference between members 26 and 27. When the two members are molded, the openings in each will have like size, and it usually is desirable to ream one of them to a slightly greater diameter to accommodate the head end screw 41. This easily can be done prior to assembly.

Each flexible hose 16 and 17 terminates at its T end in a tubular coupling member 45 which may be internally threaded, as best shown at 46 in FIGS. 6 and 9, to anchor the hose end securely. Coupling member 45 is adapted to telescope a coupling portion 38, and in the form of the invention shown, member 45 telescopes within the coupling portion.

Electrical conductors 22 and 23, as mentioned, extend from clippers 18 and 19 through hoses 16 and 17 into coupling T 15 and thence to the exterior of T 15 through the slits 39 in coupling portions 38. As best shown in FIG. 9, an electrical conductor such as conductor 22 is confined to the inner end of a slit 39 by a telescoping coupling member 45, the coupling member also being effective to close in sealing manner that part of a slit 39 unoccupied by the electrical conductor. With this arrangement leakage between the low pressure region and atmosphere is minimized, and no loss of strength in the coupling T or coupling member results from providing passage for the conductor. The arrangement just described is of great practical value in the coupling T of the invention.

Coupling member 45 will have a close fit with coupling portion 38 to insure an air seal. Further, the fit desirably should be tight enough so there will be no inadvertent displacement between member 45 and part 38, whereby the former is effective to clamp an electrical conductor, such as conductor 22, against the inner slit end 49 (FIG. 7). By so clamping conductor 22, it is possible to maintain a predetermined length of conductor within the coupling T and associated hose. This is highly desirable in that by placing conductor 22 under tension within associated hose 16, conductor 22 will hug the hose wall and thus minimize the possibility that cut hair will accumulate on the conductor and interfere with desired air flow.

The coupling T of the invention preferably is formed of molded plastic material such as impact styrene, nylon or acetal resins, although it also may be formed of moldable metal. Coupling members 45 desirably are formed of a plastic such as vinyl.

The cross-sectional areas of the two coupling portions 38 of the T are of like size and somewhat smaller than the cross sectional area of the tubular stem portion 30. Further, the central region of head portion 31 is bulbous in shape, cooperating to provide good air flow characteristics.

Hoses 16 and 17 readily are detachable from the coupling T to afford access to the interior in the unlikely event a build up of hair occurs which reduces the efficiency of the vacuum hair removal system.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. A coupling T for vacuum cleaner hose associated with electric hair clippers comprising:
   a pair of generally like members adapted on assembly to form a hollow T having a stem portion and a head portion, the junction of the assembled members lying on a plane which contains the axis of the stem portion and is normal to the axis of the head portion;
   said stem portion is tubular and adapted to telescope in sealing manner over one end of a vacuum pipe;
   means securing said pair of members together in sealed relation;
   said head portion terminating at each end in a tubular coupling portion, each coupling portion having a longitudinal slit adapted to receive an electrical conductor extending from the outside to inside of the coupling T and thence to an electric hair clipper through a hose connected between a coupling portion and the clipper; and
   a coupling member on the end of each hose telescoping a coupling portion in sealing manner and closing that part of a slit unoccupied by an electrical conductor.

2. The combination of claim 1 wherein said means securing said pair of members together includes diametrically opposed external ears on the stem portion of each member, the ears on one member in alignment on assembly with the ears on the other member, and means connecting each pair of aligned ears.

3. The combination of claim 1 wherein each coupling member telescopes within a coupling portion.

4. The combination of claim 1 with the addition of a boss on each member in the head portion, said bosses aligned on assembly, and means securing the said bosses together.

5. The combination of claim 1 wherein the cross sectional areas of the two coupling portions are of like size and smaller than the cross section area of the tubular stem portion, the central region of the head portion bulbous in shape, the said sizes and shape cooperating to provide good air flow characteristics.

6. The combination of claim 1 wherein each coupling member has a frictional relation with a coupling portion whereby the coupling member clamps an associated electrical conductor against the coupling portion at the inner slit end, thereby maintaining a predetermined length of conductor within the coupling T and associated hose.

References Cited
UNITED STATES PATENTS

| | | | |
|---|---|---|---|
| 1,006,192 | 10/1911 | Forbes | 174—71 X |
| 2,440,924 | 5/1948 | Benander | 174—71 |
| 2,745,074 | 5/1956 | Darling | 174—47 X |

LARAMIE E. ASKIN, *Primary Examiner.*

U.S. Cl. X.R.

174—47, 91; 285—156